Jan. 12, 1943.   G. W. ONKSEN, JR., ET AL   2,308,100
SIGNBOARD LAMP
Filed Aug. 2, 1940   2 Sheets-Sheet 1

Inventors
George W. Onksen Jr. &
William R. Goris
By
Blackmore, Spencer & Flint
Attorneys Patented Jan. 12, 1943

2,308,100

UNITED STATES PATENT OFFICE 2,308,100

SIGNBOARD LAMP

George W. Onksen, Jr. and William R. Goris, Anderson, Ind., assignors to General Motors Corporation, Detroit, Mich., a corporation of Delaware Application August 2, 1940, Serial No. 349,550

1 Claim. (Cl. 240—41.3)

This invention has to do with lamps for illuminating signboards.

Signboards are today usually illuminated by incandescent lamps provided with crude reflectors having simple light diffusing surfaces. As a consequence the illumination is usually very uneven and the eye is attracted and sometimes dazzled by high intensity light on the portion of the signboard nearest the lamp so that the sign itself is rendered unattractive and sometimes almost unreadable by glare.

The object of the present invention is to provide a signboard lamp of such design as to evenly illuminate a signboard unit. This is preferably accomplished by employing a multiplicity of optical elements each of which distributes light over the entire surface of the signboard unit. The result is that the light from all of the optical elements is blended together on the same signboard unit practically wiping out any unevenness of illumination which may result from imperfections in individual elements. By thus properly distributing the light, adequate illumination may be obtained with much less consumption of electricity.

While the desired illumination may be obtained by employing optical elements embodying reflection only or refraction only, we have preferred to employ a combination of special reflector and lens, the reflector being essentially of parabolic design and projecting parallel rays and the lens consisting of vertical and horizontal spreading flutes and forming with the reflector a multiplicity of optical elements each of which is designed to evenly illuminate a signboard unit of standard size. The lamp is also characterized by compactness and simplicity and may be manufactured at relatively low cost.

Figure 1:
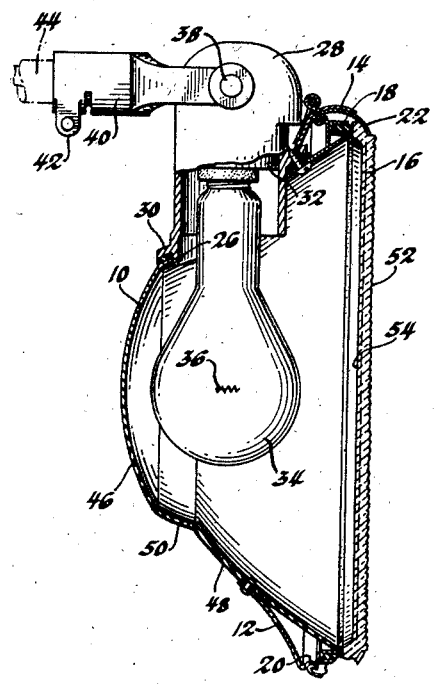
Figure 1 is a vertical section with parts in elevation through the improved lamp and its mounting.

10 indicates a reflector of special optical design which will later be described, to the forward end of which is secured ring 12. To the top of ring 12 is pivoted door 14 carrying lens 16. A sealing gasket 18 of rubber or other suitable material is provided between the reflector and lens to prevent the entrance of dust and moisture. The door 14 may be held closed in any suitable manner. We have indicated a door of split construction which may be contracted into clamping engagement with groove 20 in ring 12 and flange 22 on lens 16 by drawing up the bolt 24 connecting the door sections. With this arrangement tightening the bolt 24 not only holds the door in closed position but draws the lens into tight sealing engagement with gasket 18 by cam action.

Reflector 10 is apertured at 26 to receive housing 28 provided with flange 30 adapted to be bolted to the reflector as shown in Figure 1, a sealing gasket being interposed between the flange and the reflector. Housing 28 contains any suitable kind of lamp socket 32 in which is secured incandescent bulb 34 having a concentrated filament 36 arranged at the foci of the reflector. Housing 28 is preferably provided with trunnions 38 pivoted in bracket 40 which may be secured by a split clamp 42 to conduit 44. Conduit 44 serves not only to house the wires supplying current to the lamp but also as the supporting bracket to hold the lamp in proper position in front of the signboard.

The reflecting surface of the reflector 10 may, if desired, be made of material resistant to moisture and corrosion. It consists of a rear parabolic portion 46, a front parabolic portion 48 and an intermediate spherical portion 50, the former having their foci at the lamp filament 36 and the latter having its center at the lamp filament. The parabolic portion 46 has a longer focal length than the parabolic portion 48. The reason for using the parabolic portion 46 and spherical portion 50 instead of a simple paraboloid having the curvature of front portion 48 is to increase the distance between the bulb and the reflector to prevent injury to the bulb and reflecting surface by overheating. The same thing could be accomplished by employing a single paraboloid of longer focal length such as paraboloid 46 but if such single paraboloid were extended to intercept the same amount of light as the reflector here disclosed the result would be to greatly increase the size and cost of the lamp.

The reflector 10 with the filament 36 located at the foci provides a source of parallel rays which are spread by the lens 16 in the manner now to be described. Lens 16 is provided with horizontal flutes 52 and vertical flutes 54. One set of flutes is preferably arranged on the outside of the lens and the other set on the inside. If preferred, both sets could be located on the inner surface of the lens leaving the outside surface smooth.

Figure 4:
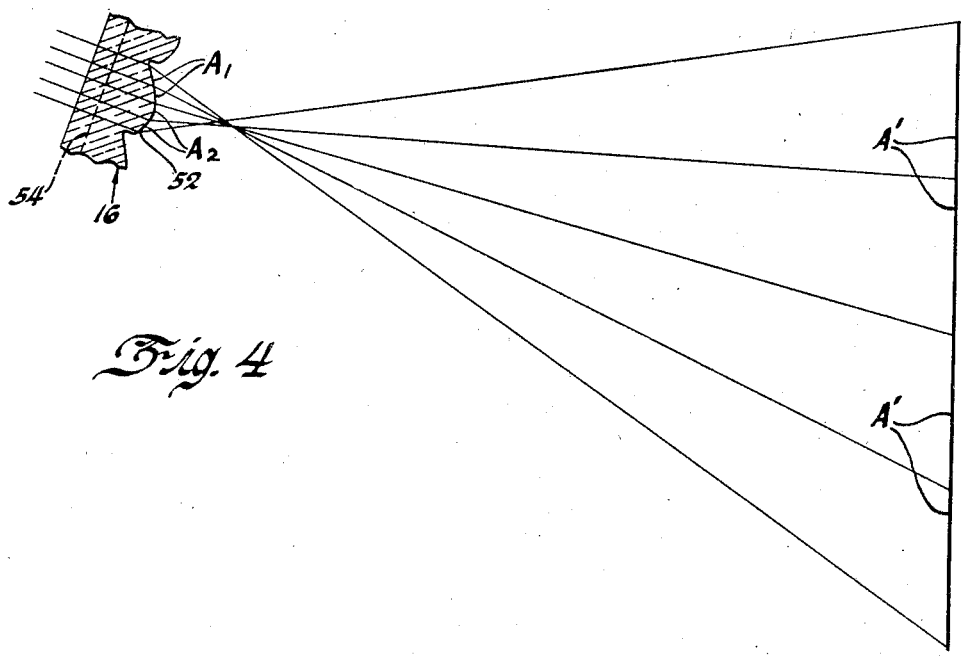
Figure 4 is a view showing schematically the distribution of light by the horizontal flutes of the lens.
Figure 5:
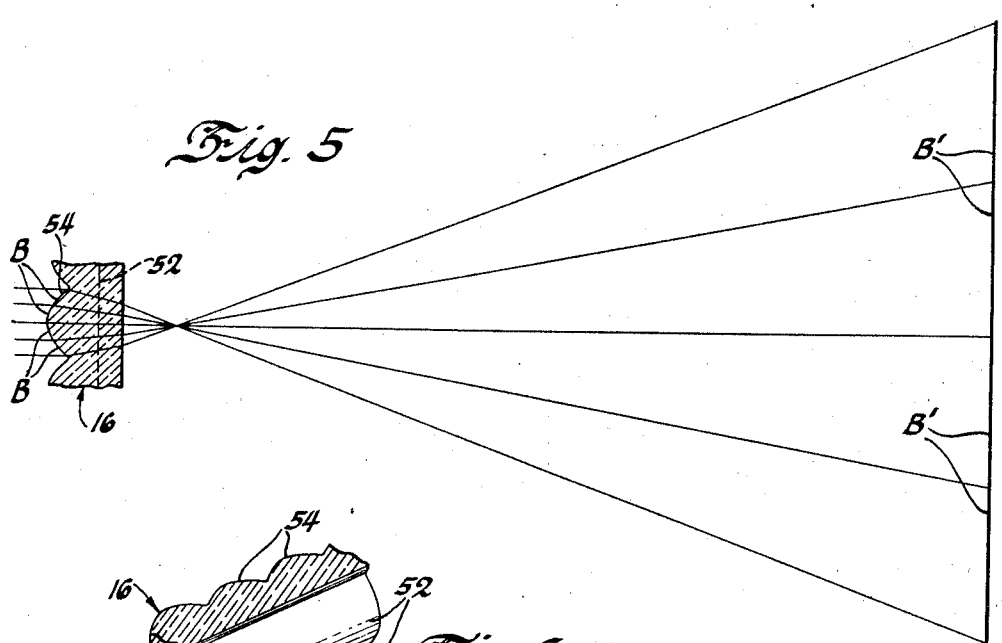
Figure 5 is a similar view showing distribution of light by the vertical flutes of the lens.

Figures 4 and 5 indicate diagrammatically the design of the flutes 52 and 54. Flutes 52 as shown in Figure 4 are asymmetrical to enable the lamp to be placed adjacent the top or the bottom of the signboard unit and at the same time spread the light evenly over it. By mounting the lamp at an angle to the signboard as indicated by the inclined position of flute segment 52 in Figure 4, flutes 52 may be designed so that the refraction at each end of them is approximately the same. It is thus possible to avoid using extreme refracting angles which would be necessary if the lamp were mounted vertically. Such extreme angles are undesirable because of increased losses due to internal reflection. Each flute 52 is preferably designed so that each of the horizontal segments $A_1$, $A_2$ of the flute illuminates an equal horizontal segment $A'$ of the signboard unit. Since it may be assumed for all practical purposes that each segment $A_1$, $A_2$ of a flute receives an approximately equal amount of light from the reflector, therefore each segment $A'$ of the signboard unit receives the same amount of light from each flute.

The asymmetricity of these flutes is characterized, as shown in Fig. 4, by progressively diminishing surface slope in one direction from the respective flute ridge, as depicted by $A_1$, and by terminally-precipitous surface slope in the other direction from said ridge, as depicted at $A_2$.

The same type of distribution is obtained horizontally by the design of vertical flute 54 illustrated in Figure 5, equal vertical segments B of these flutes distributing substantially equal amounts of light to equal vertical segments B' of the signboard unit. These flutes may be made symmetrical since the lamp may be placed centrally of the signboard unit that it is arranged to illuminate.

Figure 2:
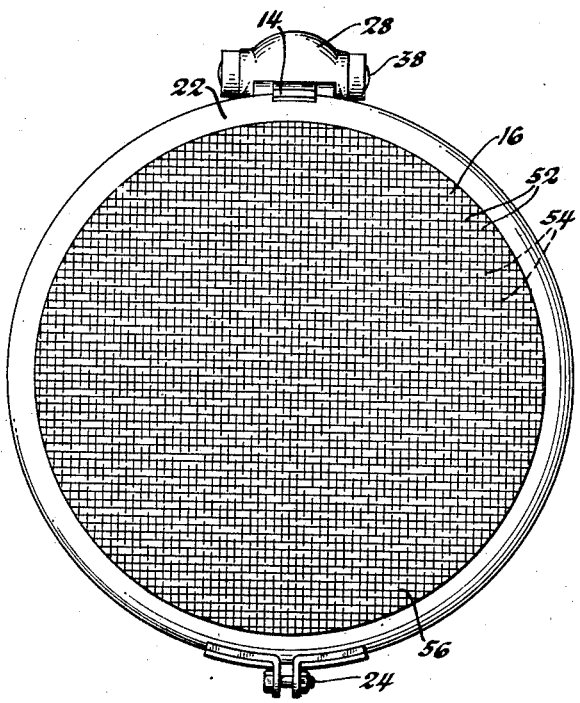
Figure 2 is a front view of the lamp of Figure 1.
Figure 3:
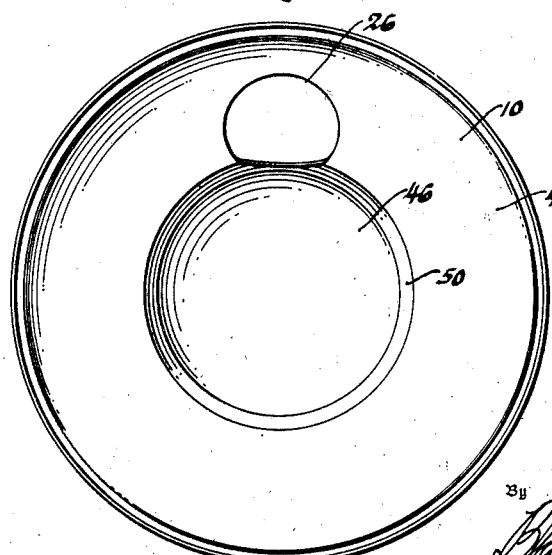
Figure 3 is a front view of the reflector.
Figure 6:
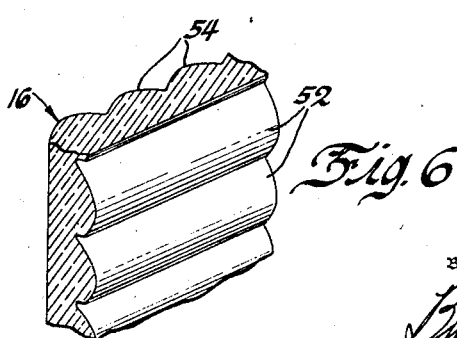
Figure 6 is a perspective view of a portion of the lens.

With the design described it will be apparent that each of the rectangular elements of the lens, one of which is indicated at 56 in Figure 2 and is shown in perspective in Figure 6 consists of the combination of an unsymmetrical horizontal flute with a symmetrical vertical flute and each of these is designed to evenly illuminate the entire length and width of a signboard unit. Should there be flaws or imperfections in any of these elements or the cooperating part of the reflector which would tend to produce uneven illumination, this effect is submerged or averaged out by the effect of the great number of similar optical units projecting coincident beam patterns on the signboard unit.

It will be understood that the average signboard is of such size as to embody several of the signboard units which our improved lamp is designed to illuminate so that several lamps will be required. These lamps should be so placed that the beam patterns slightly overlap insuring substantially the same degree of illumination of the entire area of the signboard. While, in this specification and in the claim, the "symmetrical" flutes have been described as "vertical," and the "asymmetrical" flutes as "horizontal" because of the more frequent location of signboard lamps at the top or bottom edges of the panel to be illuminated, it is obvious that—where such a lamp is to be placed at one side of the sign, the lamp would properly be twisted 90° about its axis so that the "symmetrical" flutes would be disposed horizontally and the asymmetrical flutes would be disposed vertically. Such arrangement of the lamp at a side of the sign is, of course, contemplated as within the scope of our invention as claimed.

Actual tests of the signboard light here disclosed have proven that it gives very even and satisfactory illumination free from glare with a reduction of as much as 30 or 40% in cost of electricity.

We claim:

A lamp for illuminating signboards, comprising: a reflector having a front parabolic section, an intermediate spherical section and a rear parabolic section, said parabolic sections having a common focus, said spherical section having its center at said focus and said rear parabolic section having a longer focal length than the front parabolic section, a light source at the said common focus and a lens secured over the front of the reflector, said lens being provided over its entire area with intersecting vertical and horizontal light-spreading flutes forming a multiplicity of similar lenticular elements arranged to spread light to form a multiplicity of substantially coincident beam patterns each pattern having approximately the shape and size of a signboard unit, each of said flutes being convex and curved so as to spread substantially equal amounts of light flux over portions of the signboard pattern of substantially equal area, said vertical flutes being symmetrical and said horizontal flutes each being correspondingly asymmetrical so as to spread more light to one side of the flute ridges than to the other to enable proper disposition of the lamp either above or below the center of the signboard, said corresponding asymmetricity of said horizontal flutes being characterized by progressively diminishing surface slope in one direction from the respective flute ridges and by terminally precipitous surface slope in the other direction from said ridges.

GEORGE W. ONKSEN, Jr.
WILLIAM R. GORIS.